Patented Oct. 22, 1935

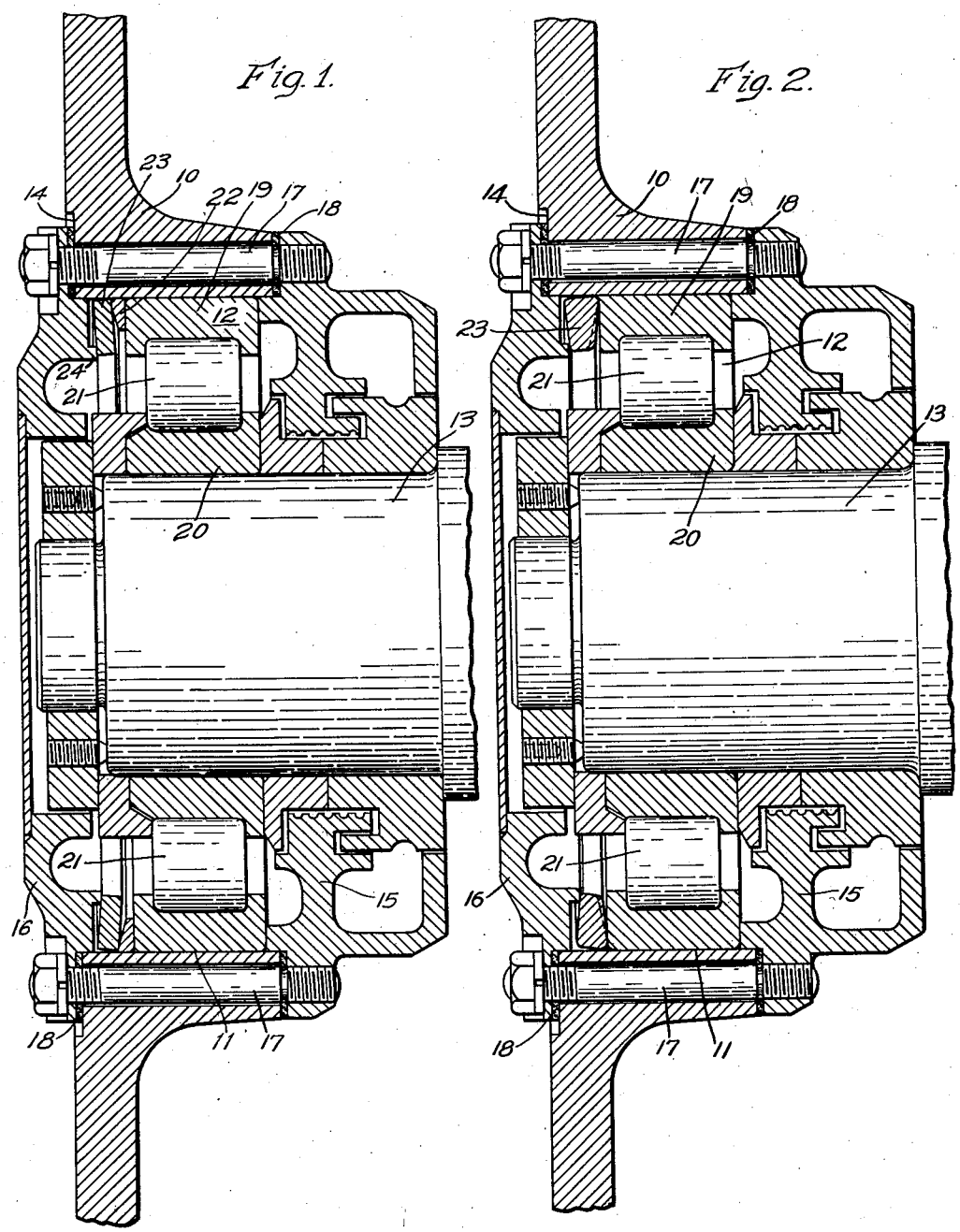

2,018,221

UNITED STATES PATENT OFFICE 2,018,221

BEARING

Erich O. Mueller, Irwin, Pa., assignor to Westinghouse Electric & Manufacturing Company, East Pittsburgh, Pa., a corporation of Pennsylvania Application February 23, 1934, Serial No. 712,542

7 Claims. (Cl. 308—236)

This invention relates generally to motor housings and more particularly to the structures for mounting bearings in motor housings.

Heretofore great difficulty has been experienced in mounting bearings in motor housings. It is very difficult and expensive to machine the outer raceways of roller bearings and the interior walls of the openings in the ends of the motor housings with great enough accuracy to provide for a fit that will not permit the raceway to rotate during the operation of the motor and will not distort the raceway. If, when the raceway is machined, it is a few thousandths of an inch smaller than the internal diameter of the opening in the motor housing, the frictional engagement is negligible and it will rotate as the motor operates. If a raceway or its seat in a motor housing is not exactly circular, and they are machined for a tight fit then when the raceway is pressed into position, it will be distorted and this will result in the bearings wearing quickly.

If the bearing is not tightly seated between the labyrinth structure and the housing cap, during the operation of the motor it may move longitudinally of the axis of the motor and will tend to pump the lubricant out of the housing. If the bearing raceway is slightly greater in length than the space allowed for it between the labyrinth structure and the housing cap, the housing cap cannot be properly seated to make a tight joint with the result that the lubricant may leak out of the housing.

The object of the invention is to facilitate the mounting of bearings in motor housings.

It is also an object of the invention to provide for holding a loosely fitting raceway of an axle bearing in a motor housing to prevent rotation during the operation of the motor.

Other objects of the invention will, in part, be obvious, and will, in part appear hereinafter.

The invention accordingly is disclosed in the accompanying drawing and comprises the features of construction, combination of elements and arrangement of parts which will be exemplified in the structure hereinafter set forth, and the scope of the application of which will be indicated in the claims.

For a fuller understanding of the nature and objects of the invention, reference may be had to the following detailed description taken in connection with the accompanying drawing, in which Figure 1 is a view in longitudinal vertical section of a portion of the motor housing showing a bearing mounted in accordance with this invention; and Fig. 2 is a view in vertical section of a modified mounting structure for a motor bearing.

Referring now to the drawing and to Fig. 1 in particular, the end section of a motor housing 10 is shown provided with a cylindrical opening 11 for receiving a roller bearing 12 suitable for carrying the rotor shaft 13. The outer wall of the housing defining the opening 11 is machined to provide a seat 14 for a housing cap.

As illustrated, a labyrinth structure 15 is provided inside of the housing 10 to cooperate in containing lubricant for the bearing. The labyrinth structure 15 and a cap 16 are mounted on the housing by means of bolts 17 which extend through the housing wall adjacent the cylindrical opening 11 provided for the bearing. In order to provide a tight joint between the labyrinth structure 15 and motor housing 10 and the housing cap 16 and its seat 14 in the motor housing, gaskets 18 are provided. Since the labyrinth structure 15 or cap 16 are not obstructed in any way, they may be drawn together pressing the gaskets 18 against the housing wall forming a lubricant tight joint.

Any suitable type of bearing 12 may be employed. In this instance, a roller bearing comprising outer and inner raceways 19 and 20, respectively, and a plurality of rollers 21 is utilized.

The outer raceway 19 and the seat provided for it in the opening in the end of the housing 10 are so machined that the raceway 19 may be easily pushed into position. Since in this structure the outer raceway 19 is not held by the seat in the housing 10, they do not have to be machined with great accuracy and may be prepared in a fraction of the time heretofore employed to obtain an accurate fit.

A steel washer 22, the outer diameter of which is substantially the same as the outer diameter of the raceway 19, is disposed in contact with the latter. As shown, the outer side face of the washer 22 is beveled.

A resilient flat steel ring 23 engages the outer edge of the washer. In order to prevent the outer raceway of the bearing from rotating during the operation of the motor, a flange 24 is provided on the housing cap 16 which extends inwardly and engages the inner portion of the flat ring and presses it inwardly as the cap 16 is drawn tightly into position by means of the bolts 17. In this manner, the resilient flat ring 23 is distorted with the result that a biasing force is exerted on the washer 22 pressing it into firm engagement with the outer raceway 19.

As the inner edge of the flat ring 23 is pressed inwardly during the mounting of the housing cap 16, its inner face rolls along the beveled face of the washer 22. The biasing force exerted on the washer will depend on the design of the structure.

The biasing force or pressure required between the washer and the outer raceway will depend on the conditions to be met, and when an engineer is informed of the conditions, he can readily design a structure which will meet them.

It will readily be appreciated that slight variations in the overall length of the motor bearing 12 may be compensated for by the amount the ring 23 is sprung. If the outer raceway 19 is slightly long, the housing cap 16 may still be drawn tightly against the gasket 18 disposed in its seat, thus making a lubricant tight joint. When a bearing 12, the raceway of which is slightly longer than specified, is employed, the spring 23 may be deflected to compensate for the excess in length of the raceway 19.

If the outer raceway is slightly shorter than specified, the spring 23 is not deflected to as great an extent as in the case of a raceway 19 that is just the proper size. However, in each instance, a biasing pressure is exerted which is sufficient to prevent the raceway from rotating during the operation of the motor.

In the structure illustrated in Fig. 2 a washer is not employed. Instead the ring 23 is beveled on the side next the bearing to permit its deflection inwardly. When the ring is deflected inwardly its beveled face rolls on the outer wall of the raceway 19.

In conclusion, it is pointed out that while the illustrated example constitutes a practical embodiment of my invention, I do not limit myself to the exact details shown, since many modifications of the same may be made without departing from the spirit of the invention as defined in the appended claims.

I claim as my invention:

1. In a motor structure in combination, a motor housing having an opening for a bearing, a bearing disposed in said opening, a washer in engagement with the bearing, a resilient member engaging said washer along a line and a housing cap for imposing substantially uniform pressure on said resilient member along the line of engagement to bias the washer against the bearing to hold it against rotation in the housing.

2. In a motor structure in combination, a motor housing, an axle bearing mounted in the housing, an annular member having one flat side and a beveled side disposed in engagement with the bearing, the beveled side facing outwardly, a resilient ring disposed in the housing with the outer portion engaging the beveled member, a housing cap mounted on the housing and a boss disposed on the housing cap to engage the resilient ring thereby to impose on the beveled member a biasing force to press it tightly against the bearing when the cap is drawn into position in the housing.

3. In a motor structure in combination, a motor housing having a cylindrical opening at one end for receiving a bearing, a bearing raceway mounted in the opening in the housing, a resilient ring disposed in said opening in alignment with the raceway and means cooperative with the ring for exerting a biasing force on the raceway to hold it against rotation in the housing.

4. In a motor structure in combination, a motor housing having a cylindrical opening for receiving a bearing, a bearing raceway disposed in the cylindrical opening, a resilient ring having a beveled facing engaging the raceway along a predetermined line, a housing cap mounted on the housing in alignment with the ring and means carried by the cap for engaging the inner portion of the ring to press it against the raceway with a substantially uniform pressure along their line of engagement when the cap is drawn into position in the housing.

5. In a motor structure, in combination, a motor housing having a cylindrical opening for receiving a bearing, a bearing raceway disposed in the cylindrical opening, a housing cap mounted on the housing, a resilient ring disposed between the raceway and housing cap, the resilient ring being so disposed that it makes a rolling contact with the raceway as it is distorted along axial lines, and means provided on the cap for engaging the ring to effect a distortion of the ring along axial lines to effect a pressure engagement between the ring and the raceway to hold the raceway against rotation in the housing.

6. In a motor structure in combination, a motor housing having a cylindrical opening at one end for receiving a bearing, a bearing raceway mounted in the opening in the housing, a resilient ring disposed in said opening to engage the end of the raceway along a substantially circular line and means cooperative with the ring for exerting a biasing force on the raceway to hold it against rotation in the housing.

7. In a motor structure in combination, a motor housing having a cylindrical opening at one end for receiving a bearing, a bearing raceway mounted in the opening in the housing, a resilient ring disposed in said opening to engage the end of the raceway along a substantially circular line and means cooperative with the ring for exerting a substantially uniform biasing force on the raceway to hold it against rotation in the housing.

ERICH O. MUELLER.